US011184293B2

(12) United States Patent
Hu (10) Patent No.: US 11,184,293 B2
(45) Date of Patent: Nov. 23, 2021

(54) COST-EFFECTIVE AND SELF-ADAPTIVE OPERATORS FOR DISTRIBUTED DATA PROCESSING (71) Applicant: SAP SE, Walldorf (DE)

(72) Inventor: Dongqing Hu, Shanghai (CN)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 16/714,043

(22) Filed: Dec. 13, 2019

(65) Prior Publication Data
US 2021/0184990 A1 Jun. 17, 2021

(51) Int. Cl.
G06F 15/16 (2006.01)
H04L 12/911 (2013.01)
H04L 29/08 (2006.01)
G06F 9/48 (2006.01)

(52) U.S. Cl.
CPC ............ H04L 47/82 (2013.01); G06F 9/4881 (2013.01); H04L 67/10 (2013.01)

(58) Field of Classification Search
CPC ..................................................... H04L 67/10
See application file for complete search history.

(56) References Cited

U.S. PATENT DOCUMENTS

| 4,972,314 | A * | 11/1990 | Getzinger | G06F 9/4494 711/149 |
| 9,104,271 | B1 * | 8/2015 | Adams | G06F 3/014 |
| 10,447,668 | B1 * | 10/2019 | Norum | H04L 9/12 |
| 2006/0242433 | A1 * | 10/2006 | Fu | H04W 52/029 713/300 |
| 2008/0114870 | A1 * | 5/2008 | Pu | G06F 9/5077 709/224 |
| 2009/0300615 | A1 * | 12/2009 | Andrade | G06F 16/24568 718/100 |
| 2011/0055239 | A1 * | 3/2011 | Wolf | G06F 16/24568 707/759 |
| 2013/0031556 | A1 * | 1/2013 | Branson | G06F 9/4887 718/103 |
| 2014/0172952 | A1 * | 6/2014 | Varney | H04L 47/70 709/203 |
| 2015/0254094 | A1 * | 9/2015 | Cao | G06F 9/5077 718/1 |
| 2015/0286684 | A1 * | 10/2015 | Heinz | G06F 16/9024 707/769 |
| 2016/0156514 | A1 * | 6/2016 | Salonidis | H04L 41/12 709/223 |

(Continued)

Primary Examiner — Hieu T Hoang
(74) Attorney, Agent, or Firm — Sterne, Kessler, Goldstein & Fox P.L.L.C.

(57) ABSTRACT

Disclosed herein are system, method, and computer program product embodiments for efficiently maintaining a distributed processing of data between a source and sink. An embodiment operates by maintaining a scheduler in communication with the source and the sink, wherein the source and the sink communicate over a network. The scheduler identifies an utilization of a resource unit of the source, the sink and/or the network meeting or exceeding a predetermined threshold. After identifying that the utilization of the resource unit of the source, the sink and/or the network meets or exceeds a predetermined threshold, the scheduler triggers an operator of the source and/or the sink. The operator modifies a processing of data by the at least one of the source and the sink.

20 Claims, 4 Drawing Sheets (56) References Cited

U.S. PATENT DOCUMENTS

| | | | |
|---|---|---|---|
| 2017/0070571 A1* | 3/2017 | Branson | G06F 3/0635 |
| 2017/0161332 A1* | 6/2017 | Barsness | G06F 16/24569 |
| 2017/0168748 A1* | 6/2017 | Barsness | G06F 3/0653 |
| 2017/0235555 A1* | 8/2017 | Cook | G06F 11/1433 |
| | | | 717/153 |
| 2018/0083839 A1* | 3/2018 | Fawcett | H04L 41/20 |
| 2018/0270123 A1* | 9/2018 | Cook | H04L 65/602 |
| 2018/0278663 A1* | 9/2018 | Cook | H04L 65/4069 |
| 2018/0336244 A1* | 11/2018 | Barsness | G06F 16/24524 |
| 2019/0317823 A1* | 10/2019 | Koster | G06F 8/656 |
| 2019/0370408 A1* | 12/2019 | Potharaju | G06F 16/24568 |
| 2019/0385087 A1* | 12/2019 | Martin-Maroto | G06N 5/043 |
| 2019/0392139 A1* | 12/2019 | Nikolai | G06F 21/552 |
| 2020/0004600 A1* | 1/2020 | Acker | H04L 67/1008 |
| 2020/0076912 A1* | 3/2020 | Cortes | H04L 41/5054 |

\* cited by examiner

COST-EFFECTIVE AND SELF-ADAPTIVE OPERATORS FOR DISTRIBUTED DATA PROCESSING

BACKGROUND

Data integration typically involves transferring data between a source to a sink over a network. The source and the sink may comprise various components (e.g., an operating system, a processor, a memory, a clock, a hard drive, and an amount of cache space) to send and receive data. As such, the source and/or sink may have limited resources for performing their defined functions based on their respective specifications. Moreover, the network may have limited resources (e.g., a bandwidth) for handling the data to be transferred between the source and the sink.

Accordingly, the data transfer between the source and the sink may overwhelm the resources of their respective components and/or the network. In an attempt to alleviate these issues, prior systems have taken a programmatic approach of hardcoding the best order for specific scenarios. However, this approach can be inflexible and may require significant development and operational effort for changes. Further, this approach may not consider the real-time cost of the sink or source in processing the data in different scenarios.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for maintaining a distributed processing of data. For the distribution of data processing, in some embodiments, the present disclosure utilizes an independent scheduler to modify the processing of data between a sink and source maintained on a network. The source and the sink may comprise operators (e.g., a filter, a rejector, a projector, a compressor, and a decompressor) to perform preprogrammed actions. The source and the sink may also comprise resources (e.g., e.g., an operating system, a processor, a memory, a clock, a hard drive, and an amount of cache space) for performing their defined functions. Likewise, the network comprises resources for permitting the receiving and sending of data.

As such, the independent scheduler may determine that the resource utilization of the source, the sink and/or the network meets or exceeds a predetermined threshold. Thereafter, the independent scheduler may trigger an operator of the source and/or sink to modify the processing of data by the source and/or sink. The trigger may result in the operator turning on or off. Alternatively, the trigger may result in the operator moving from the source to the sink or vice versa. Consequently, the operators are self-adaptive based on the real-time cost of processing data.

Figure 1:
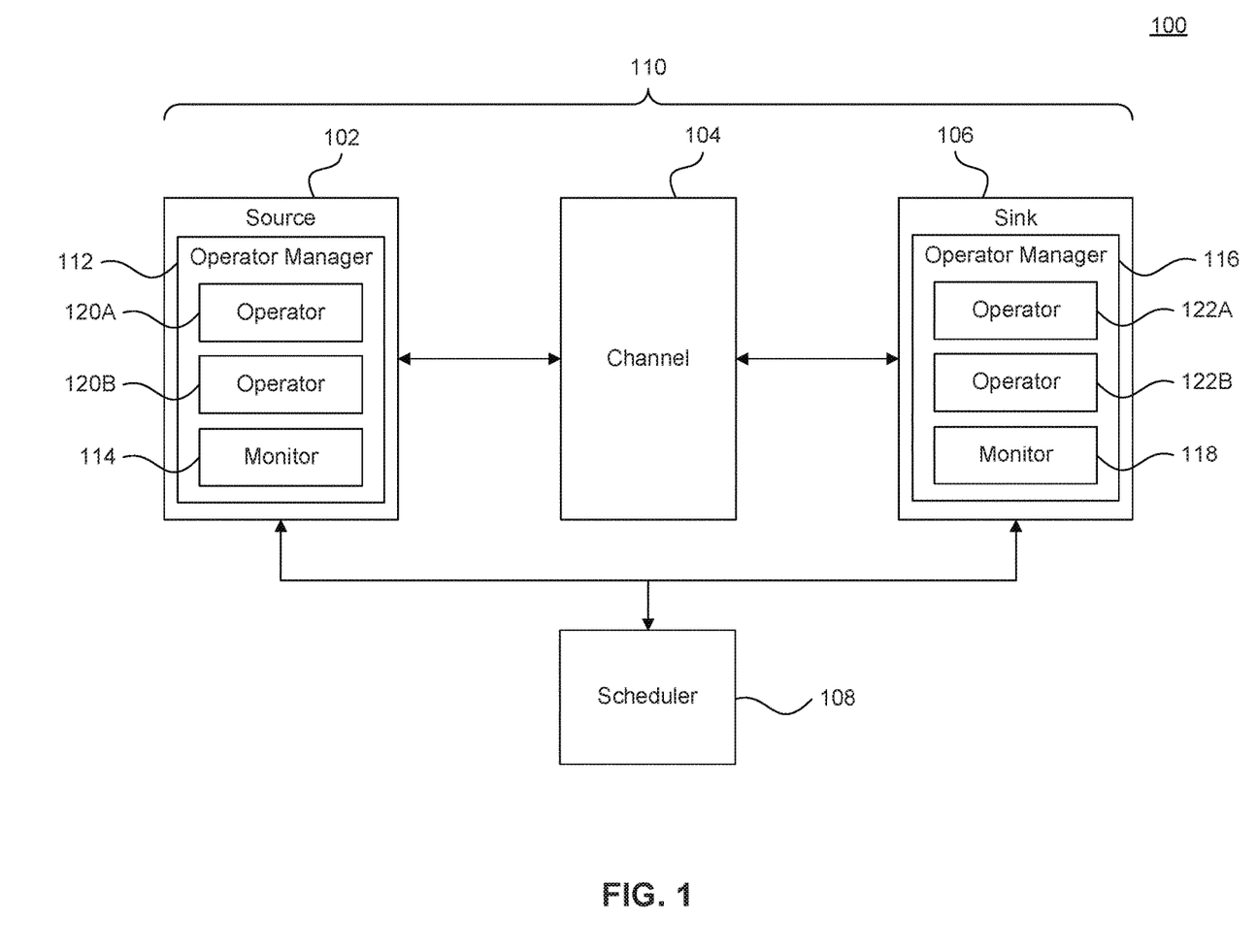
FIG. 1 is a block diagram of an example system for maintaining a distributed processing of data, according to some embodiments.

FIG. 1 illustrates an example system 100 for providing distributed data processing. System 100 includes source 102 and sink 106. Source 102 and sink 106 may be computing devices, which may be shared amongst multiple users. In some embodiments, source 102 communicates with sink 106 directly. Alternatively, source 102 and sink 106 communicate through channel 104. Channel 104 provides a physical transmission medium or a logical connection between source 102 and sink 106.

Source 102, channel 104 and sink 106 communicate over network 110. In some embodiments, source 102, channel 104, and sink 106 may be managed by an entity (e.g., a business). As such, network 110 may be managed by the same entity managing source 102, channel 104, and sink 106. Alternatively, network 110 may be managed by an independent entity from source 102 and sink 106. Moreover, network 110 may provide limited network resources to source 102 and sink 106 for sending and receiving data. As such, network 110's network resources may limit the capability of source 102 and/or sink 106 to send and/or receive data. Network resources may include network bandwidth, computer programs, data storage, storage devices, and printers, to provide a few examples.

Similarly, source 102 and sink 106 comprise components (e.g., physical and virtual) for performing predetermined actions for processing data, which may have limited system resources for performing their associated actions. Source 102's and sink 106's components may be an operating system, a processor, a memory (e.g., RAM or ROM), a clock, a hard drive, and an amount of cache space, to provide a few examples. As such, the source 102's and sink 106's resource may include arithmetic logic units (ALUs), memory, and/or decoders, cache memory, an amount of memory, hard disk space, IRQs and DMA channels, to provide a few examples.

Source 102 and sink 106 include operator manager 112/116 and monitor 114/118. Operator manager 112/116 may be a container of operators 120A-B/122A-B and may be configured to manage operators 120A-B/122A-B. For example, operator manager 112/116 may move an operator from source 102 to sink 106 and vice-versa. Operator manager 112/116 may also activate or deactivate operators 120A-B/122A-B.

Along these lines, operators 120A-B/122A-B may be a piece of code, a script, or a rule. Thus, operators 120A-B/122A-B may have a preprogrammed action to be carried out on a data packet. For example, the preprogrammed actions of operators 120A-B/122A-B may relate to filtering (e.g., excluding select data according to predefined criteria), rejecting (e.g., excluding all data), projecting (e.g., transforming data to another form which may reduce its size), compressing (e.g., reducing data size, such as gzip), and decompressing (e.g., increasing data size). Along these lines, these preprogrammed actions may be user-defined. Thus, operators 120A-B/122A-B may be a filter operator, a rejector operator, a projector operator, a compressor, a decompressor operator, and/or any user-defined operator.

Moreover, operators 120A-B/122A-B may be statically built and thus dynamically linked to each other. For example, if operators 120A-B/122A-B are deployed in multiple locations (e.g., source 102 and sink 106), a move or deactivation of a particular operator (e.g., compressor operator) at a particular location (e.g., source 102) may require a move or deactivation of a corresponding operator (e.g., decompressor) at another location (e.g., sink 106).

Monitor 114/118 is deployed beside operator manager 112/116. Monitor 114/118 may continually observe source 102's/sink 106's resource utilization and their operators 120A-B/122A-B selectivity and processing cost. As will be discussed in more detail below, monitor 114/118 may send network 110's resource utilization. Monitor 114/118 may then send source 102's/sink 106's/network 110's resource utilization and source 102's/sink 106's operators 120A-B/122A-B selectivity and processing cost, to scheduler 108. Scheduler 108 may then determine an appropriate action, for example, by determining if a resource utilization and/or an efficiency of the operators 1204-B/122A-B meets or exceeds a predetermined threshold.

As such, selectivity refers to an amount of data that operators 120A-B/122A-B are able to reduce. Accordingly, some operators 120A-B/1224-B may have an infinite selectivity. Thus, the monitor 114 does not have to monitor the selectivity or cost for these operators 120A-B/122A-B, and the scheduler 108 does not determine an efficiency of these operators 120A-B/122-A-B. Further, some operators 120A-B/122A-B (e.g., projector) may have a known selectivity. As such, monitor 114/118 may determine the selectivity at a single point in time and send it to the scheduler 108, or the scheduler 108 may be aware of it. The "projector" operator's selectivity may be equal to a total tuple size divided by the output tuple size (e.g., input_tuple_size/output_tuple_size).

Accordingly, monitor 114/118 may monitor operators 120A-B/122A-B having finite, unknown selectivity, for example, by counting input and output values and computing their ratio. The "filter" operator's selectivity may be equal to a total count divided by the pass count (e.g., total_count/pass_count). As such, for the "filter" operator, a low pass rate indicates a high selectivity, and a high pass rate indicates a low selectivity. Moreover, the "compressor" operator's selectivity may be equal to the output data size divided by the input data size (i.e., ouput_data_size/input_data_size). As such, the "compressor" operator's selectivity may be equal to one divided by the compression rate (i.e., 1/compression_rate).

As stated above, monitor 114/118 also observe the cost of a specific operator 120A-B/122A-B or a group of operators 120A-B/122A-B collectively. Cost refers to an amount of resources of the source 102/sink 106 that operators 120A-B/122A-B consume over a period of time. Accordingly, in some embodiments, the cost may refer to an amount of resources of the source 102/sink 106 that a specific operator 120A-B/122A-B consumes over a period of time. Cost may also refer to an amount of resources of the source 102/sink 106 that a group of operators 120A-B/122A-C collectively consume over a period of time. In these embodiments, the period of time may be predetermined by an authorized user of source 102, sink 106, and/or scheduler 108.

After determining the cost and selectivity of operators 120A-B/122A-B, monitor 114/118 may determine the efficiency of the operators 120A-B/122A-B. The efficiency of operators 120A-B/122A-B may be equal to their selectivity divided by their cost. In some embodiments, the monitor 114/118 may send a notification to scheduler 108 when the efficiency of the operators 120A-B/122A-B meets or exceeds a predetermined threshold. Alternatively, when cost and/or selectivity of operators 120A-B/122A-B meet or exceed a predetermined threshold, monitor 114/118 may send cost and/or selectivity of operators 120A-B/122A-B to scheduler 108 to determine their efficiency. An authorized user of source 102, sink 106, and/or scheduler 108 may specify the predetermined threshold for the efficiency, cost, and/or selectivity.

Scheduler 108 is in communication with source 102 and sink 106. In some embodiments, scheduler 108 may be added onto a pre-existing system 100 comprising source 102, channel 104, and/or sink 106. As such, scheduler 108 may be added onto a pre-existing system 100 while running and replace any prestored scheduling rules (e.g., such as those provided by source 102, sink 106, network 110). Alternatively, scheduler 108 may be a preexisting part of system 100. When source 102's/sink 106's/network 110's resource utilization meet or exceed a predetermined threshold, scheduler 108 provides source 102's and/or sink 106's operator manager 112/116 with a message to trigger operators 120A-B/122A-B. For example, the scheduler 108 may provide operator manager 112/116 with a message to trigger a specific operator. As stated above, the triggering may include activating, deactivating, or moving the operator. By operating in this fashion, scheduler 108 assists system 100 (e.g., source 102 and/or sink 106) in dynamically distributing data processing.

To dynamically distribute data processing, scheduler 108 may determine a resource utilization for source 102, sink 106, and/or network 110, for example, through utilization of CPU and/or bandwidth. As such, scheduler 108 may receive and/or determine if a resource utilization for source 102, sink 106, and network 110 meets or exceeds a predetermined level. For example, in some embodiments, when identifying that a particular resource utilization of source 102 meets or exceeds a predetermined threshold, scheduler 108 may determine a utilization of the remaining resources of source 102 and/or a utilization of the same resource at sink 106. Likewise, when identifying that a particular resource utilization of network 110 meets or exceeds a predetermined threshold, as will be discussed below, scheduler 108 may determine or receive a utilization of resources by source 102 and/or sink 106.

Along these lines, to also dynamically distribute data processing, scheduler 108 may also determine the efficiency of source 102's and sink 106's operators 120A-B/122A-B. Accordingly, as discussed above, in some embodiments, scheduler 108 may receive the efficiency of source 102's and sink 106's operators 120A-B/122A-B. Alternatively, scheduler 108 may receive the selectivity and cost of source 102's and sink 106's operators 120A-B/122A-B, and determine their efficiency based on the received selectivity and cost.

Scheduler 108 may also monitor a resource utilization of network 110. The resource may relate to a bandwidth of network 110 or a component of a data center infrastructure providing network 110. Example components may be a switch, a processor, a memory, a LAN (e.g., a VLAN), and a DNS, to provide a few. For example, in some embodiments, scheduler 108 may determine if network 100's utilization meets or exceeds a predetermined threshold (e.g., 90%).

As such, scheduler 108 may also receive a degree of utilization of network 110's resource (e.g., from 0 to 100) from the network 110 itself when the resource's utilization meets or exceeds a predetermined threshold. Likewise, scheduler 108 may receive a degree of source 102's/sink 106's resource utilization from the source 102/sink 106 itself when the resource's utilization meets or exceeds a predetermined threshold. Alternatively, scheduler 108 may receive the source 102's and sink 106's resource utilization and the network 110's resource utilization from the source 102/sink 106/network 110 itself and determine when it meets or exceeds a predetermined threshold. Scheduler 108 may also determine the efficiency of source 102's/sink 106's operators 120A-B/122A-B based on their received selectivity and cost.

When the efficiency of source 102's and/or sink 106's operators 120A-B/122A-B, and/or the resource utilization of sink 102/sink 106/network 110, meet or exceed the predetermined threshold, scheduler 108 may trigger operators 120A-B/122A-B by sending a message to operator manager 112/116. As such, for example, in some embodiments, when the source 102's, sink 106's, or network 110's resources are overwhelmed (e.g., the CPU utilization reaches 100%), scheduler 108 triggers operators 120A-B/122A-B by sending a message to operator manager 112/116. Operator manager 112/116 may then activate or deactivate operators 120A-B/122A-B. Operator manager 112/116 may also send source 102's operators 120A-B to sink 106 or sink 106's operators 122A-B to source 102.

In some embodiments, before triggering operators 120A-B/122A-B, scheduler 108 may determine if operators 120A-B/122A-B are unordered or ordered. If unordered, operators 120A-B/1224-B may be moved in any order. For example, source 102's operator 120B may move before operator 120A, and sink 106's operator 122B may move before operator 122A. As such, in some embodiments, the operator 120A-B/122A-B with the lowest efficiency may move first. However, if operators 120A-B/122A-B are ordered, they must follow a prescribed sequence. For instance, operator 120B must follow operator 120A, and operator 122B must follow operator 122A. As such, in some embodiments, the operators 120A-B/122A-B may move irrespective of their efficiency.

Figure 2:
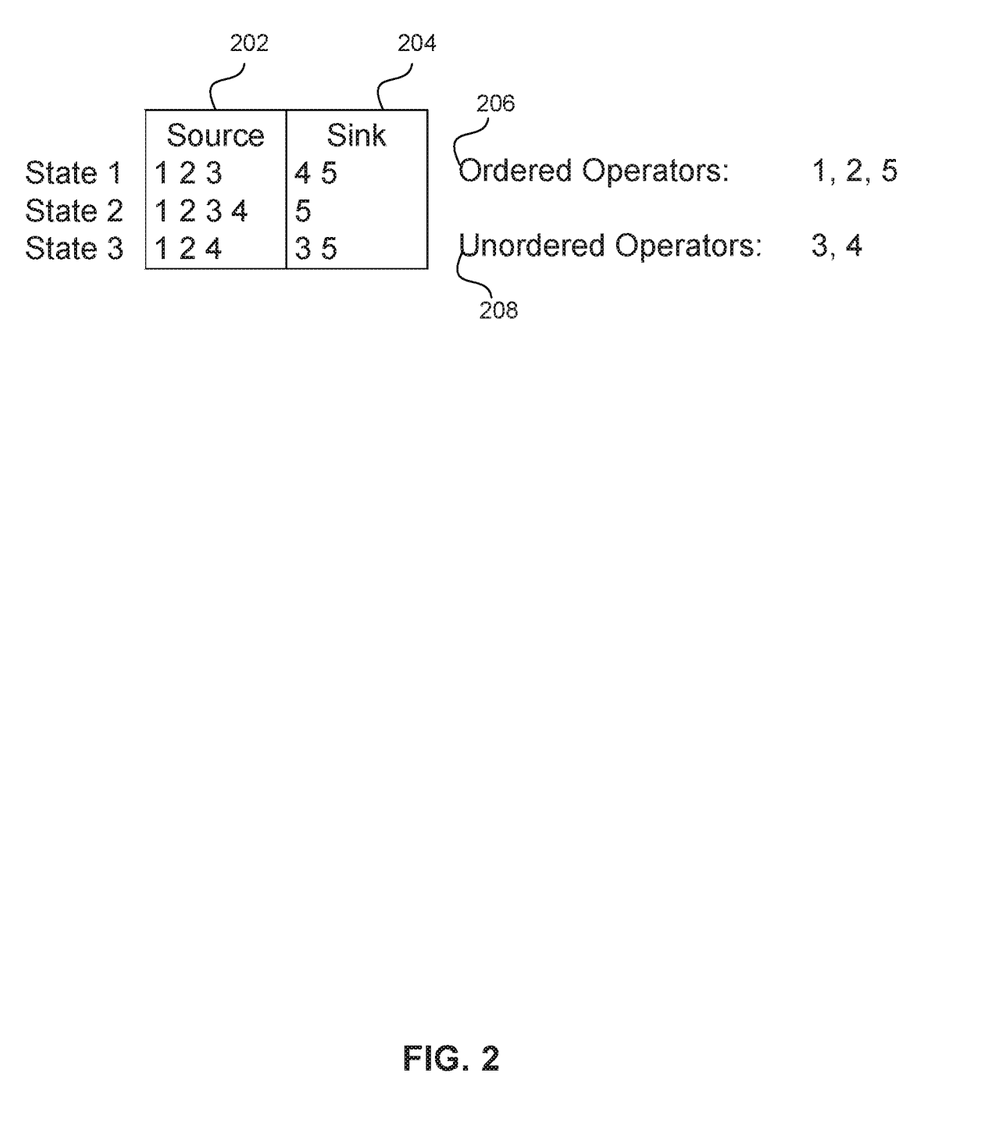
FIG. 2 is an example of a process for maintaining a distributed processing of data between the sink and source of the system of FIG. 1, according to some embodiments.

FIG. 2 illustrates source 202 and sink 204 having ordered and unordered operators in a plurality of states. Source 202 and sink 204 comprise an ordered group of operators 206 (i.e., "1," "2," and "5") and an unordered group of operators 208 (i.e., "3" and "4"). Accordingly, the ordered group of operators 206 must maintain the "1," "2," "5" sequence, whereas the unordered group of operators 208 can move arbitrarily.

As illustrated, in "state 1," source 202 comprises operators "1," "2," and "3," and sink 204 comprises operators "4" and "5." In "state 2," operator "4" moves from sink 204 to source 202. As such, source 202 comprises operators "1," "2," "3," and "4," and sink 204 comprises operator 5. After that, in "state 3," operator "3" is moved to sink 204. As such, source 202 comprises operators "1," "2," and "4," and sink 204 comprises operators "3" and "5." Accordingly, albeit the moves of operators "3" and "4" during states "1" and "2," the ordered operators "1," "2," and "5" maintained their sequence.

Referring back to FIG. 1, after triggering operators 120A-B/122A-B due to the resource utilization of the source 102 sink 106, and/or network 110 meeting or exceeding a predetermined threshold, scheduler 108 may monitor resource utilization and determine if another one of operators 120A-B/122A-B needs to be triggered. The triggering of a subsequent operator may be a result of a difference resource utilization.

As such, scheduler 108 may have a priority list for determining preference to source 102's resources, sink 106's resources, and/or network 110's resources. The priority list may specify the whose resource to prioritize between the source 102, sink 106, and/or network 110. In some embodiments, for example, the resource priority list may specify that network 110's resources are more important than source 102's resources, which are more important than sink 106's resources. Accordingly, when a resource of network 110 and source 102 are both exhausted (e.g., meeting or exceeding their respective predetermined threshold), scheduler 108 may prefer saving the network resource over the source 102's resource. Likewise, when a resource of network 110 and sink 106 are both exhausted (e.g., meeting or exceeding their respective predetermined threshold), scheduler 108 may prefer saving the network 110's resources over the sink 106's resources. Further, when a resource of source 102 and sink 106 are both exhausted (e.g., meeting or exceeding their respective predetermined threshold), scheduler 108 may prefer saving the source 102's resources over the sink 106's resources.

Scheduler 108 may provide operators 120A-B/122A-B with a current state. As such, the current state may be one of a plurality of possible states based on the resource utilization of source 102, sink 106, and/or network 110 meeting or exceeding a predetermined threshold. For example, in some embodiments, the current state may be one of "not started," "stable," and "changing." The "not started" state may be provided before the system 100 running. The "stable" state may be provided when scheduler 108 has yet to detect and/or determine the resource utilization of source 102, sink 106', and/or network 110 meeting or exceeding a predetermined threshold. The "changing" state may be provided when scheduler 108 decides that operators 118A-C/120A-C are to be moved based on the resource utilization of source 102, sink 106, and/or network 110 meeting or exceeding a predetermined threshold. For example, when system 100 is turned on, the scheduler 108 may provide operators 120A-B/122A-B with the "stable" state." When scheduler 108 determines the resource utilization of source 102, sink 106, and/or network 110 meets or exceeds the predetermined threshold, scheduler 108 changes the current state to "changing" until one or more of operators 120A-B/122A-B are moved. After operators 120A-B/122A-B are moved, scheduler 108 changes the status of the system 100 back to "stable." In some embodiments, when changes are being made to operators 120A-B/122A-B (e.g., moving an operator from source 102 to sink 106 or vice-versa), scheduler 108 may not provide any additional changes to current or different operators 120A-B/122A-B (e.g., moving different operators from source 102 to sink 106 or vice-versa, or activating current or different operators).

Along these lines, scheduler 108 may determine if operator 120A-B/122A-B is idempotent before a move of operator 120A-B/122A-B (e.g., from source 102 to sink 106 or vice versa). Accordingly, first, scheduler 108 may determine an identity of the operator 120A-B/122A-B. Based on the identity, scheduler 108 may consider the operator 120A-B/122A-B as idempotent. For example, the "filter," "rejector," and "projector" operators may be considered idempotent.

If scheduler 108 does not identify operator 120A-B/122A-B as idempotent, scheduler 108 may declare the operators 120A-B/122A-B as non-idempotent. Scheduler 108 may then attach a tag to data packets processed by non-idempotent operator 120A-B/122A-B. The tag may be transferred along with the payload of the data packet from the source 102 to the sink 106 or vice versa to signal to the source 102 and 106 that it has been processed. As such, when a non-idempotent operator 118A-C/120A-C processes a data packet at a departing location (e.g., source 102) and receives the packet at the destination location (e.g., sink 106), non-idempotent operator 118A-C/120A-C may determine that it has already processed the data packet and thus skip processing of the data packet.

In this way, in the "stable" state, idempotent and non-idempotent operators perform operations only once. In the "changing" state, idempotent and non-idempotent operators perform operators only or, at most, twice. For example, in the "changing" state, non-idempotent operators perform actions only once, and idempotent operations perform operators once or twice.

Figure 3:
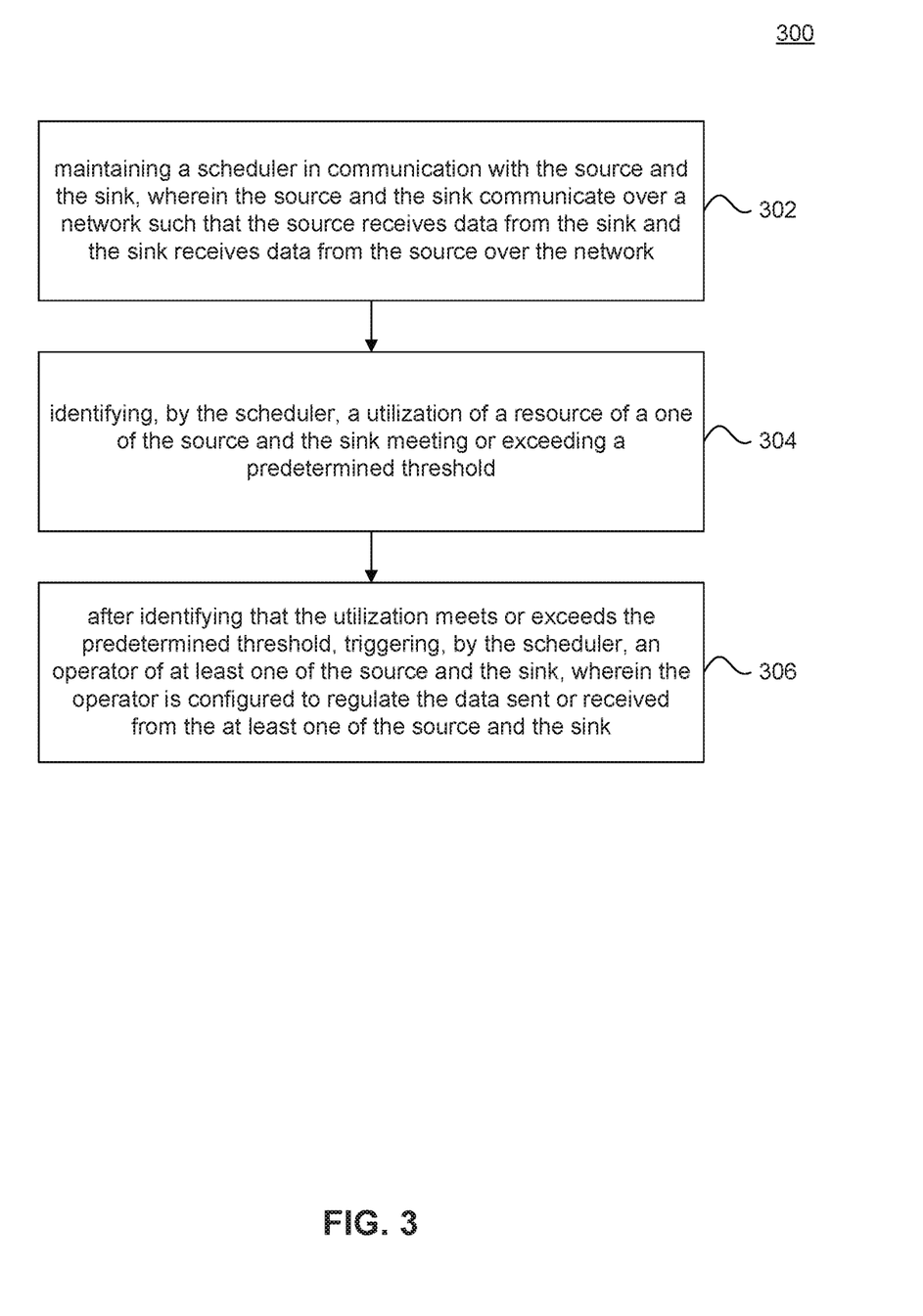
FIG. 3 is a flowchart of an example process for maintaining a distributed processing of data, according to some embodiments.

FIG. 3 is a flowchart for a method 300 for maintaining a distributed processing of data, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 3, as will be understood by a person of ordinary skill in the art.

Method 300 shall be described with reference to FIG. 1. However, method 300 is not limited to that example embodiment.

At 302, scheduler 108 maintains communication with source 102 and sink 106. Source 102 and sink 106 communicate over network 110 such that source 102 receives data from the sink 106 and sink 106 receives data from the source 102 over the network 110. Source 102 and sink 106 may be a computing device, which may be shared by multiple users. Along these lines, scheduler 108 may be a third party device configured to manage source 102's and sink 106's operators 120A-B/122A-B.

At 304, scheduler 108 determines if a utilization of a resource of at least one of source 102 and sink 106 meets or exceeds a predetermined threshold. The resource of source 102 and sink 106 may relate to one of their components, such as a processor or a memory. Likewise, scheduler 108 may also determine if an utilization of a resource of network 110 meets or exceeds a predetermined threshold. Network 110's resource may relate to a bandwidth availability or a component of a data center infrastructure providing network 110.

In some embodiments, scheduler 108 may determine an efficiency of an operator 120A-B/122A-B of at least one of source 102 and sink 106. In doing so, scheduler 108 may determine the operator's 120A-B/122A-B selectivity and processing cost. For example, the efficiency utilization of source 102's and sink 106's operators 120A-B/122A-B equates to their selectivity divided by their cost. In some embodiments, scheduler 108 may receive the selectivity and cost of operators 120A-B/122A-B from monitor 114/116.

At 306, after identifying that the utilization of the resource of source 102, sink 106 and/or network 110 meets or exceeds the predetermined threshold, scheduler 108 triggers operators 120A-B/122A-B of at least one of source 102 and sink 106, such that operator 120A/122A is configured to modify a processing of data by the at least one of source 102 and sink 106.

In some embodiments, triggering may be activating source 102's operator 122A or sink 106's operator 122B. Along these lines, triggering may also be moving operator 120A from source 102 to sink 106 or operator 122A from sink 106 to source 102. Accordingly, to activate or move operators 120A/122A, scheduler 108 may send a message to operator manager 112/116, which manages operators 120A/120B. For example, when the utilization of the resource of source 102 and/or network 110 exceeds the predetermined threshold, scheduler 108 moves an operator from source 102 to sink 106. For another example, when the utilization of the resource of sink 106 exceeds the predetermined threshold, scheduler 108 moves an operator from sink 106 to source 102.

In some embodiments, the operator may be one of a filter configured to exclude received data according to predefined criteria, a rejecter configured to exclude received data, a projector configured to transform received data into a different format, and a compressor configured to reduce a size of the received data.

Figure 4:
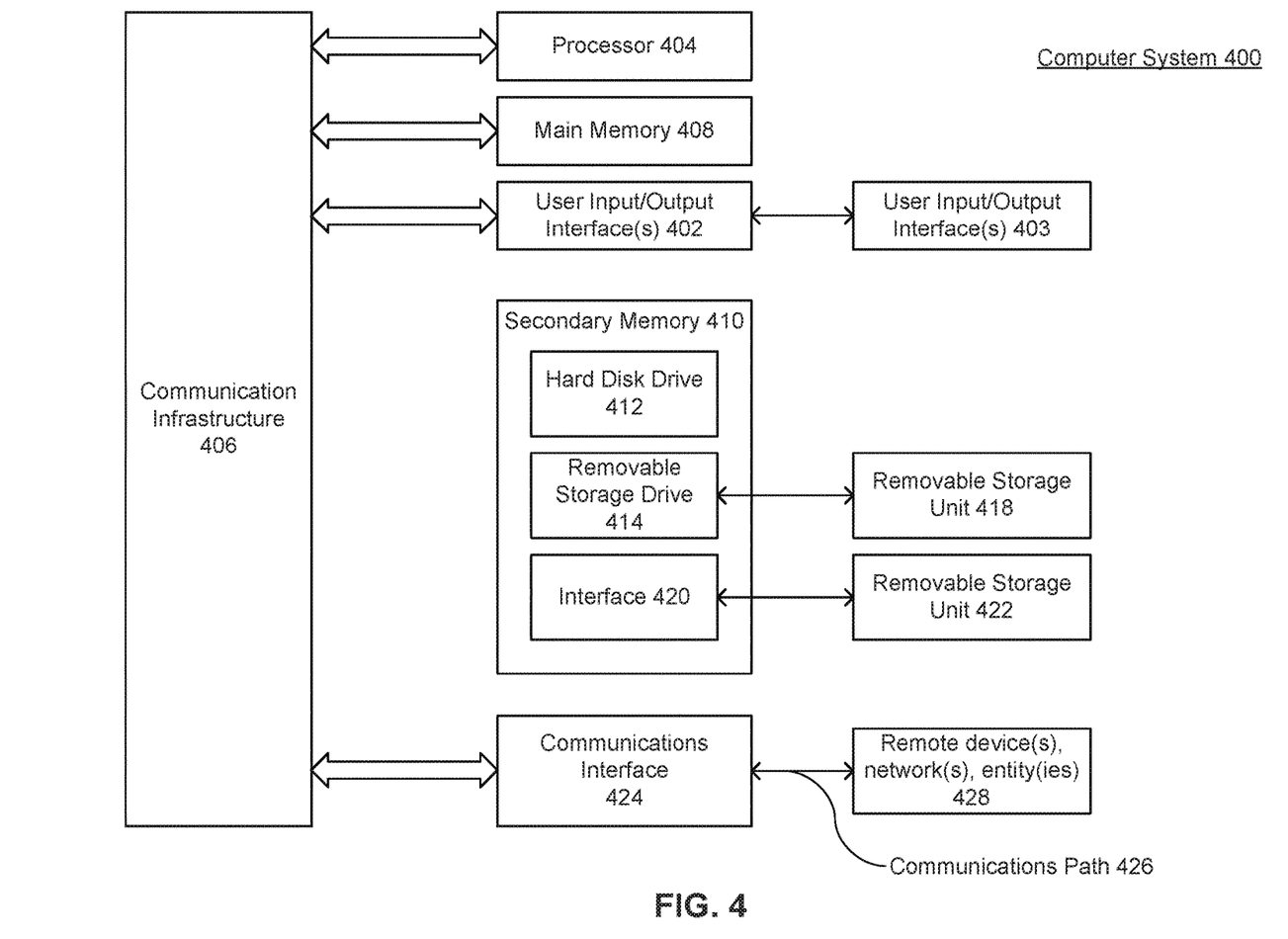
FIG. 4 is an example computer system useful for implementing various embodiments.

Various embodiments may be implemented, for example, using one or more well-known computer systems, such as the computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer-usable or readable storage device having stored thereon computer software (control logic) and/or data. Removable storage unit 418 may be a floppy disk, magnetic tape, compact disk. DVD, optical storage disk, and/any other computer data storage device. Removable storage drive 414 may read from and/or write to the removable storage unit 418.

Secondary memory 410 may include other means, devices, components, instrumentalities, or other approaches for allowing computer programs and/or other instructions and/or data to be accessed by computer system 400. Such means, devices, components, instrumentalities, or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (NON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the preceding. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited to that. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for efficiently maintaining a distributed processing of data between a source and a sink, comprising:

maintaining a scheduler in communication with the source and the sink, wherein the source and the sink are configured to send or receive data packets over a network;

determining, by the scheduler, an utilization of a resource of at least one of the source and the sink meeting or exceeding a predetermined threshold;

after determining that the utilization of the resource of the at least one of the source and the sink meets or exceeds the predetermined threshold, sending, by the scheduler, a message to at least one of the source and sink to move a first operator of at least one of the source and the sink to the other one of the source and sink, wherein the first operator is configured to modify a processing of data by the at least one of the source and the sink; and assigning, by the scheduler, a status of changing to the first operator, wherein the status of changing is different from a status of stable, and wherein the first operator is in the status of stable before determining by the scheduler that the utilization of the resource of the at least one of the source and the sink meets or exceeds the predetermined threshold.

2. The computer-implemented method of claim 1, wherein the resource of the at least one of the source and the sink relates to a component of the source and the sink, respectively.

3. The computer-implemented method of claim 1, further comprising:

determining, by the scheduler, an utilization of a resource of the network meeting or exceeding a second predetermined threshold; and after determining that the utilization of the resource of the network meets or exceeds the second predetermined threshold, triggering, by the scheduler, the first operator of the at least one of the source and the sink.

4. The computer-implemented method of claim 3, wherein the resource of the network is an available bandwidth of the network.

5. The computer-implemented method of claim 1, further comprising sending, by the scheduler, a message to the source to activate the first operator at the source; and sending, by the scheduler, a message to the sink to activate the first operator at the sink.

6. The computer-implemented method of claim 1, further comprising:

identifying, by the scheduler, an utilization of a second resource of at least one of the source and the sink meeting or exceeding a second predetermined threshold.

7. The computer-implemented method of claim 1, further comprising:

determining, by the scheduler, that the first operator is non-idempotent; and adding, by the scheduler, a tag to a data packet processed by the first operator so that the first operator skips the data packet after being moved.

8. The computer-implemented method of claim 1, wherein at least one of the source and the sink comprises a second operator configured to modify the processing of data by the at least one of the source and the sink, and further comprising:

identifying, by the scheduler, an utilization of a second resource of at least one of the source and the sink meeting or exceeding a second predetermined threshold;

after identifying that the utilization of the second resource of at least one of the source and the sink meets or exceeds the second predetermined threshold, sending, by the scheduler, a message to at least one of the source and sink to move the second operator to the other one of the source and sink, wherein the second operator is configured to modify a processing of data by the at least one of the source and the sink.

9. The computer-implemented method of claim 8, wherein the second operator processes the data packet at each of the source and the sink.

10. The computer-implemented method of claim 1, wherein at least one of the source and the sink comprises a second operator configured to modify the processing of data by the at least one of the source and the sink.

11. The computer-implemented method of claim 10, further comprising:

assigning, by the scheduler, the status of stable to the second operator.

12. The computer-implemented method of claim 11, wherein the first operator processes the data packet once.

13. The computer-implemented method of claim 11, wherein the second operator processes the data packet once or twice based on the second operator being idempotent or non-idempotent.

14. The computer-implemented method of claim 10, wherein the first operator and the second operator are to be moved to prioritize one or more of the source, the sink, and the network.

15. The computer-implemented method of claim 14, further comprising:

determining, by the scheduler, that the first operator is declared as an ordered operator;

identifying, by the scheduler, an ordered group of the first operator, the ordered group providing a required order for a plurality of operators including the first operator; and prior to moving the first operator, confirming, by the scheduler, that the move of the first operators does not conflict with the required order of the ordered group.

16. The computer-implemented method of claim 1, wherein the first operator is one of a filter configured to exclude received data according to predefined criteria, a rejecter configured to exclude received data, a projector configured to transform received data into a different format, and a compressor configured to reduce a size of the received data.

17. A system, comprising:

a memory; and at least one processor coupled to the memory and configured to:

maintain a scheduler in communication with a source and a sink, wherein the source and the sink communicate over a network such that the source receives data from the sink and the sink receives data from the source over the network;

identify, by the scheduler, an utilization of a resource of at least one of the source and the sink meeting or exceeding a predetermined threshold;

after identifying that the utilization of the resource of the at least one of the source and the sink meets or exceeds the predetermined threshold, sending, by the scheduler, a message to at least one of the source and sink to move an operator of at least one of the source and the sink to the other one of the source and sink, wherein the operator is configured to modify a processing of data by the at least one of the source and the sink; and assigning, by the scheduler, a status of changing to the operator, wherein the status of changing is different from a status of stable, and wherein the operator is in the status of stable before determining by the scheduler that the utilization of the resource of the at least one of the source and the sink meets or exceeds the predetermined threshold.

18. The system of claim 17, wherein the at least one processor is further configured to determine that the operator is non-idempotent, and add a tag to a data packet processed by the operator so that the operator skips the data packet after being moved.

19. A non-transitory computer-readable device having instructions stored thereon that, when executed by at least one computing device, causes the at least one computing device to perform operations comprising:

maintaining a scheduler in communication with a source and a sink, wherein the source and the sink communicate over a network such that the source receives data from the sink and the sink receives data from the source over the network;

identifying, by the scheduler, an utilization of a resource of at least one of the source and the sink meeting or exceeding a predetermined threshold;

after identifying that the utilization of the resource of the at least one of the source, the sink meets or exceeds the predetermined threshold, sending, by the scheduler, a message to at least one of the source and sink to move an operator of at least one of the source and the sink to the other one of the source and sink, wherein the operator is configured to modify a processing of data by the at least one of the source and the sink; and     assigning, by the scheduler, a status of changing to the operator, wherein the status of changing is different from a status of stable, and wherein the operator is in the status of stable before determining by the scheduler that the utilization of the resource of the at least one of the source and the sink meets or exceeds the predetermined threshold.

20. The non-transitory computer-readable device of claim 19, wherein the instructions, when executed by at least one computing device, cause the at least one computing device to perform operations further comprising:

determining that the operator is non-idempotent; and adding a tag to a data packet processed by the operator so that the operator skips the data packet after being moved.

* * * * *